United States Patent
Wynn et al.

[11] Patent Number: 6,104,583
[45] Date of Patent: *Aug. 15, 2000

[54] OVERCURRENT PROTECTION SYSTEMS

[76] Inventors: Craig Wynn, 4207 Manuela Ave., Palo Alto, Calif. 94306; St. Elmo Nickols, III, P.O. Box 671, Los Gatos, Calif. 95031-0671

[*] Notice: This patent is subject to a terminal disclaimer.

[21] Appl. No.: 09/280,356

[22] Filed: Mar. 29, 1999

Related U.S. Application Data

[63] Continuation of application No. 08/958,808, Oct. 28, 1997, abandoned, which is a continuation-in-part of application No. 08/867,682, Jun. 2, 1997, Pat. No. 5,831,803.

[51] Int. Cl.$^7$ ...................................................... H02H 3/00
[52] U.S. Cl. ........................... 361/7; 361/9; 361/94; 361/106; 361/166; 361/187; 361/93.5; 361/93.6
[58] Field of Search ........................... 361/93.1, 93.5, 361/93.6, 93.7, 93.8, 93.9, 94, 103, 106, 3, 5–9, 13, 166, 187; 338/22 R

[56] References Cited

U.S. PATENT DOCUMENTS

| | | | |
|---|---|---|---|
| 4,012,669 | 3/1977 | Gelfand et al. | 361/97 |
| 5,666,244 | 9/1997 | Thomas et al. | 361/8 |
| 5,689,395 | 11/1997 | Duffy et al. | 361/93 |
| 5,737,160 | 4/1998 | Duffy | 361/3 |
| 5,831,803 | 11/1998 | Wynn et al. | 361/7 |

*Primary Examiner*—Michael J. Sherry

[57] ABSTRACT

An overcurrent protection system containing (1) a current sensing means; (2) a first switch coupled to the current sensing means; (3) a voltage sensing means; (4) a PTC device; and (5) a second switch coupled to the voltage sensing means. In one type of system, the second switch is connected in series with a parallel combination of the first switch and the PTC device; and the voltage sensing means is connected in parallel with a series combination of (i) the second switch and (ii) the parallel combination of the first switch and the PTC device. In another type of system, the first switch, the PTC device and the voltage sensing means are connected in parallel with each other; and the second switch (i) is a switch which latches in the open position and (ii) is connected in series with the parallel combination of the first switch, the PTC device and the voltage sensing means.

13 Claims, 2 Drawing Sheets

OVERCURRENT PROTECTION SYSTEMS

RELATED APPLICATIONS

This application is a continuation of U.S. patent application Ser. No. 08/958,808 filed on Oct. 28, 1997, now abandoned, which is a continuation-in-part of U.S. patent application Ser. No. 08/867,682, filed Jun. 2, 1997, now U.S. Pat. No. 5,831,803, the entire disclosure of which is incorporated herein by reference for all purposes.

BACKGROUND OF THE INVENTION

1. Field of the Invention

This invention relates to electrical protection systems.

2. Introduction to the Invention

The parent application, now U.S. Pat. No. 5,831,803, discloses electrical protection systems. Such systems can be connected between an electrical power supply and an electrical load to form an operating circuit. When so connected, such systems protect the circuit from overcurrents. The disclosed systems have a normal operating condition and a fault condition. Such systems include a current sensing means, such as a current relay coil having a current deenergized state when the current passing through it does not exceed a normal current, $I_{NORMAL}$, by a predetermined current amount; and, a current energized state when the current passing through it has exceeded the normal current, $I_{NORMAL}$, by the predetermined current amount. The systems further include a first circuit switch coupled to the current sensing means (relay coil) which is closed in the current deenergized state and open in the current energized state. The systems further include a voltage sensing means, such as a voltage sensing relay coil, having a voltage deenergized state when the voltage across the voltage sensing means does not exceed a predetermined voltage amount, and a voltage energized state when the voltage exceeds the predetermined voltage amount. The systems also include a PTC device connected in parallel with the first switch, and a second circuit switch. The second circuit switch is coupled with the voltage sensing means and is closed in the voltage deenergized state and opened in the voltage energized state. The second circuit switch is connected in series with the parallel combination of the first circuit switch and the PTC device. The voltage sensing means is connected in parallel with a series combination of the second switch and the parallel combination of the first circuit switch and the PTC device.

The described systems are similar to the system shown in FIG. 2c of U.S. Pat. No. 5,689,395 with the advantage that opening of the second circuit switch transfers the system voltage to the voltage sensing means. Therefore, the arrangement of the disclosed systems of the parent application ensures that the second circuit switch continues to open and remain open without relay chatter.

SUMMARY OF THE INVENTION

The specific current sensing means disclosed by way of preferred example in the parent application is a current sensing relay. We have found that under some circumstances, a current sensing relay is not the preferred current sensing means. For example, if the fault condition produces intermittent or repetitive current surges, this can result in the current relay being rapidly energized and deenergized in a way which is not satisfactory. We have discovered an alternative current sensing means, which can be used in all the circuits previously disclosed and is particularly useful when there is a possibility that the fault condition will produce intermittent or repetitive current surges. This current sensing means is responsive not only to the size, but also the duration of the current (for example so that it will not convert the first circuit switch from the closed to the open position unless the current exceeds a predetermined level for more than 1 millisecond) and thus ensures that the current to the load is cut off or reduced only when some function of the size and the duration of the current exceeds a predetermined value.

We have also discovered that, providing the second switch will latch in the open position, the components (1) to (5) can be arranged in a different configuration, namely with the first circuit switch, the PTC device and the voltage sensing means connected in parallel; and the second circuit switch, and the parallel combination of the first circuit switch, the PTC device and the voltage sensing means, being connected in series.

In one aspect, this invention provides an electrical protection system which can be connected in series between an electrical power supply and an electrical load to form an operating circuit, and which when so connected protects the circuit from overcurrents, the system having a normal operating condition and a fault condition, and comprising:

(1) a time-integrating current sensing means having
   (a) a current deenergized state, when a function of the size of the current passing through the load does not exceed a predetermined value, and
   (b) a current energized state, when an overcurrent causes said function to exceed said predetermined value;

(2) a first circuit switch which
   (a) has an open state and a closed state, and
   (b) is coupled to the current sensing means so that, when the first circuit switch is in a closed position and said function increases from below to above said predetermined value, the first circuit switch is converted to the open state;

(3) a voltage sensing means having
   (a) a voltage deenergized state when the voltage across the voltage sensing means does not exceed a predetermined voltage amount, and
   (b) a voltage energized state when the voltage across the voltage sensing means exceeds the predetermined voltage amount;

(4) a PTC device; and (5) a second circuit switch which
   (a) has an open state and a closed state, and
   (b) is coupled to the voltage sensing means so that, when the second circuit switch is in the closed state, and the voltage sensing means is converted from the voltage deenergized state to the voltage energized state, the second circuit switch is converted from the closed state to the open state;

the components (1) to (5) being connected so that (A) the second circuit switch is connected in series with the parallel combination of the first circuit switch and the PTC device; and the voltage sensing means is connected in parallel with the series combination of (i) the second switch and (ii) the parallel combination of the first circuit switch and the PTC device; or (B) the first circuit switch, the PTC device and the voltage sensing means are connected in parallel with each other; and the second circuit switch, and the parallel combination of the first circuit switch, the PTC device and the voltage sensing means, being connected in series, the second circuit switch being a switch which latches in the open position.

In another aspect, this invention provides electrical circuits comprising an electrical power supply, an electrical load and an electrical protection system according to the first aspect of the invention.

BRIEF DESCRIPTION OF THE DRAWINGS

The invention is illustrated in the accompanying drawings, in which.

DETAILED DESCRIPTION OF THE INVENTION

Figure 1:
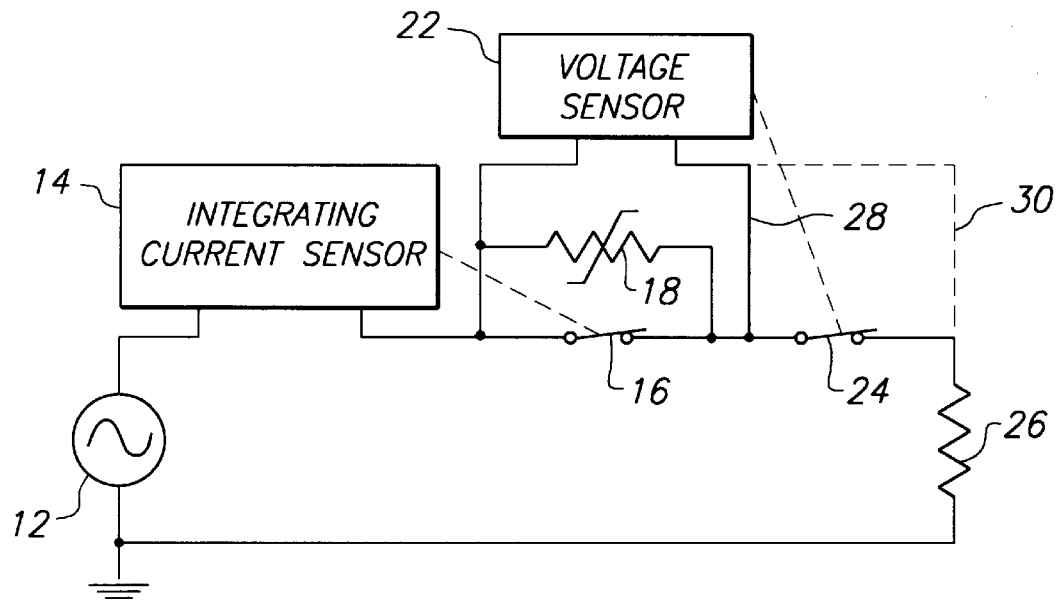
FIGS. 1 and 2 are circuit diagrams of circuits of the invention.

In one preferred embodiment, the time-integrating current sensing means comprises (i) a voltage output which provides a signal voltage related to said function of the current passing through the load;
(ii) a voltage source which supplies a reference voltage; and
(iii) a comparator which makes a comparison between the signal voltage and the reference voltage, and provides an output which reflects the result of that comparison.

The signal voltage can for example be the voltage across a resistor through which flows a current proportional to the current through the load, or the voltage from a current transformer coupled to a conductor through which flows a current proportional to the current through the load, or the voltage from a magneto resistive device coupled to a conductor through which flows a current proportional to the current through the load.

In the simplest embodiment of the invention, the function of the current passing through the load is simply the magnitude of that current (subject to the inherent property of all current sensing means, namely that an overcurrent pulse can be so short that it is not recognized by the current sensing means as having a magnitude greater than a predetermined minimum). In another embodiment, the function is a function of (i) the size of the current passing through the load, and (ii) the duration of the current passing through the load, with the function being something other than that inherent in the current sensing means itself (for example, a function such that the predetermined value cannot be exceeded when the duration of the overcurrent is less than 1 millisecond, or less than 25 milliseconds, or less than 50 milliseconds, or less than 100 milliseconds). Alternatively or additionally, the current sensing means can be one which can be programmed to change the predetermined value and/or which is adaptive, i.e. which observes the current (or another variable) over a period and sets the predetermined value in response to the current (or the other variable) during the period of observation.

In various embodiments of the invention, one of the first and second switches is a switch which latches in the open position and the other is a non-latching switch; or both are latching switches; or both are non-latching switches. In one embodiment, the components (1) to (5) are connected in accordance with paragraph (A) of the Summary above, and the second circuit switch does not latch in the open state when it is converted into the open state. This has the advantage that if the cause of the overcurrent is removed, the circuit reverts to normal operation. In another embodiment, the components (1) to (5) are connected in accordance with paragraph (B) of the Summary above, and each of the first and second circuit switches latches in the open state when it is converted from the closed state to the open state. This has the advantage that no current flows through the load after the overcurrent has triggered the protection system, but the disadvantage that the switches must be reset, even after the cause of the overcurrent has been removed, before normal operation can be restored. However, when the system employs a current sensing means which has a reference voltage, and/or is programmable and/or is adaptive, it is not difficult to design a system in which the switches can be reset remotely, e.g. by means of an electrical signal, thus removing the need for manual resetting.

A preferred protection system of the invention comprises
(1) a current sensing means having
   (a) a current deenergized state, when a function of (i) the size of the current passing through the load, and (ii) the duration of the current passing through the load, does not exceed a predetermined value, and
   (b) a current energized state, when an overcurrent causes said function to exceed said predetermined value,
and the current sensing means comprising
   (i) a voltage output which generates a signal voltage related to said function,
   (ii) a voltage source which supplies a reference voltage, and
   (iii) a comparator which makes a comparison between the signal voltage and the reference voltage, and provides an output which reflects the result of that comparison;
(2) a first circuit switch which
   (a) has an open state and a closed state, and
   (b) is coupled to the current sensing means so that, when the first circuit switch is in the closed state and said function increases from below to above said predetermined value, the output from the comparator converts the first circuit switch from the closed state to the open state;
(3) a voltage sensing means having
   (a) a voltage deenergized state when the voltage across the voltage sensing means does not exceed a predetermined voltage amount, and
   (b) a voltage energized state when the voltage across the voltage sensing means exceeds the predetermined voltage amount;
(4) a PTC device; and
(5) a second circuit switch which
   (a) has an open state and a closed state, and
   (b) is coupled to the voltage sensing means so that, when the second circuit switch is in the closed position and the voltage sensing means is converted from the voltage deenergized state to the voltage energized state, the second circuit switch is converted from the closed state to the open state and latches in the open state;
the first circuit switch, the PTC device and the voltage sensing means being connected in parallel with each other; and the parallel combination of the first circuit switch, the PTC device and the voltage sensing means, and the second circuit switch, being connected in series with each other. In this circuit, it is preferred that
   (a) the first circuit switch is a first relay which is normally closed and which latches in the open state;
   (b) the second circuit switch is a second relay which is normally closed and which latches in the open state;
   (c) the output from the comparator, when said function increases from above to below said predetermined value, closes a third relay which is normally open and does not latch in a closed state, thus causing flow of a current which opens the first circuit switch; and (d) the voltage sensing means
(i) comprises a fourth relay which is normally open and which latches in the closed state, and
(ii) when it is converted from the voltage deenergized state to the voltage energized state, closes the fourth relay, thus causing flow of a current which opens the second circuit switch.

Referring now to the drawings, FIG. 1 shows a circuit which includes a power source 12, a load 26, first and second circuit switches 16 and 24, a PTC device 18, a current sensing means 14 and a voltage sensing means 22. The current sensing means 14 is coupled to the first circuit switch 16, and the voltage sensing means 22 is coupled to the second circuit switch 24. The current sensing means 14 senses the current in the circuit. When it detects an overcurrent condition, it opens the first circuit switch 16, which latches in the open position, thus diverting the current to the PTC device 18 which is connected in parallel with the first circuit switch 16. Normally the resistance of the PTC device 18 is smaller than the resistance of the voltage sensing means 22, so most of the current flows through the PTC device 18. The PTC device 18 increases in resistance, thereby limiting the current in the circuit, and applies a voltage across the voltage sensing means 22. When the voltage across the voltage sensing means 22 reaches a predetermined level, it opens the second circuit switch 24, which latches in the open position.

Providing that the voltage sensing means 22 will latch in the open (voltage energized state) position, it may be connected directly in parallel with the PTC device 18 and the first switch 16, as shown by the path 28. Alternatively, the voltage sensing means 22 may be connected in parallel with a series combination of the second switch 24 and the parallel combination of the PTC 18 and first switch 16, as shown by the connection path 30.

Figure 2:
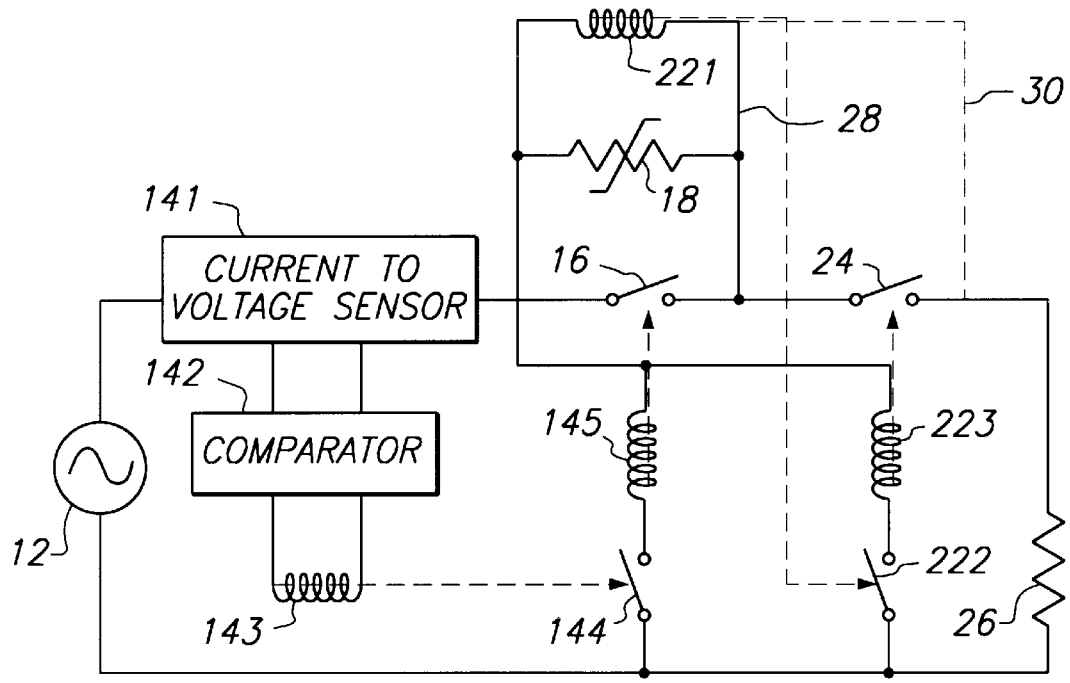

FIG. 2 is a somewhat more detailed version of FIG. 1. The current sensing means comprises a voltage output 141 which provides a signal voltage proportional to a function of the current flowing through the load. The signal voltage is sent to a comparator 142 which compares the voltage signal to a predetermined reference voltage, and provides a current output which reflects the result of that comparison and which is passed to a relay coil 143 which controls normally open relay contacts 144. When the output from the comparator reflects the fact that the function of the load current has exceeded the predetermined level, the relay contacts 144 close, causing current to flow through a relay coil 145, which in turn opens the first circuit switch 16, which latches in the open position. The voltage sensing means comprises a relay coil 221 which controls normally open relay contacts 222. When the voltage across the relay coil reaches the predetermined voltage amount, the relay contacts 222 close, causing current to flow through a relay coil 223, which in turn opens the second circuit switch 24, which latches in the open position. Since the first circuit switch latches open, the predetermined voltage amount can be at any appropriate level, typically a level below the interrupt rating of the second circuit switch 24.

A current sensing means of the kind in FIG. 2 is electronic, rather than electromagnetic (as in a current relay). The use of an electronic sensing means makes it possible to adjust the system, e.g. through the use of capacitors and resistors, to produce a wide variety of different results; for example to obtain whatever averaging time constant is desired for the current. For example, if a fault current has surges which are repetitive with a period of 16 milliseconds, a current relay will respond with repetitive opening and closing with the same period, producing an oscillating "buzzing" sound, and potentially damaging the contacts. An electronically controlled sensing method can be selected to average the surges over a longer time-period, such as 100 milliseconds. The output will then be a smoothed value, which can be easily compared with a reference value. Another advantage is precise operation of the circuit. With an electronic current sensing method, the trigger current for operation may be selected much more precisely than is possible with a current relay, given the variation in fitting together he mechanical components of a relay. Nor is it necessary to worry about matching pull-in and drop-out currents, as discussed in the parent application, now U.S. Pat. No. 5,831,803.

Another advantage of electronically controlled current sensing is that there is low power dissipation associated with latching contacts. Operation of these contacts requires an input signal, which can then be removed, since the contacts will remain in their latched position. This means that, in normal operation, the circuit requires no power dissipation other than a low value associated directly with the resistance of the contacts, typically near 100 milliohms. Once the circuit has operated and the contacts are latched in their open position, again there is no ongoing power required to maintain their position.

Another advantage is that the time-averaging constant can be selected to ensure that lightning surges do not trigger the protection system. Another advantage is that the system can be designed so that, in the "tripped" or open state, all current paths are interrupted by open contacts, including paths between the high-voltage or "hot" conductor and neutral (ground) and between the input and output of the "hot" conductor.

Two features of the type of current sensor shown in FIG. 2 need to be recognized. The first is the requirement of contact with the neutral (ground) conductor in order to power the latching relays. Usually this is not a difficult requirement, since a ground or low-voltage contact is available from the power supply. The second is the requirement for a minimum system voltage. If the system voltage (the voltage difference between the "hot" conductor and neutral) is below the minimum operating voltage of the first and second circuit switches, these relay switches will not operate and the circuit will remain in the conducting state, even though fault current may be flowing. This means that this type of protection may be used in cases where the system voltage does not drop below the operating voltage of the relays in the case of an overcurrent fault, e.g., between a utility electric supply and a downstream power supply, but should not be used, for example, on the secondary side of transformers whose output voltage may collapse when shorted.

Figure 3:
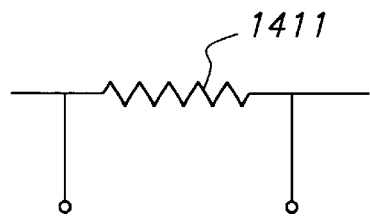
FIGS. 3, 3A, 4 and 5 are circuit diagrams of parts of circuits of the invention.
Figure 3A:
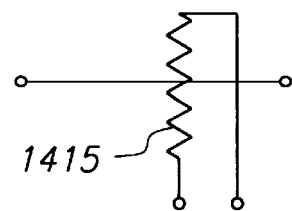
Figure 4:
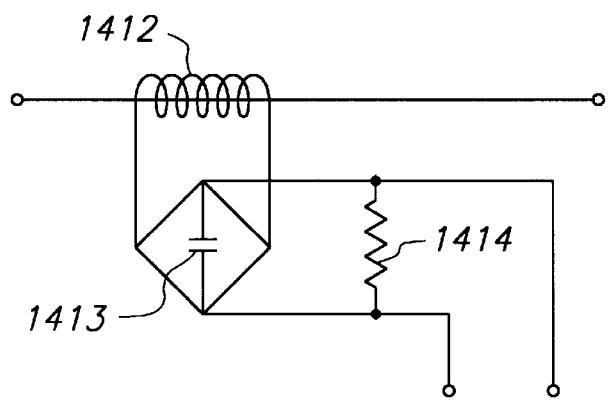

FIGS. 3, 3A and 4 show circuit diagrams for the voltage output suitable for use in FIG. 2. In FIG. 3, the signal voltage is the voltage across a precisely known resistor 1411. In FIG. 3A the signal voltage is sensed across a magneto-resistive element 1415 in proximity with a load-carrying conductor. In FIG. 4, the voltage output comprises a current transformer 1412 coupled to a conductor which carries the circuit current, and the induced voltage is supplied to a circuit containing a capacitor 1413 and a resistor 1414 which average the current over a desired time period to provide the desired voltage signal.

Figure 5:
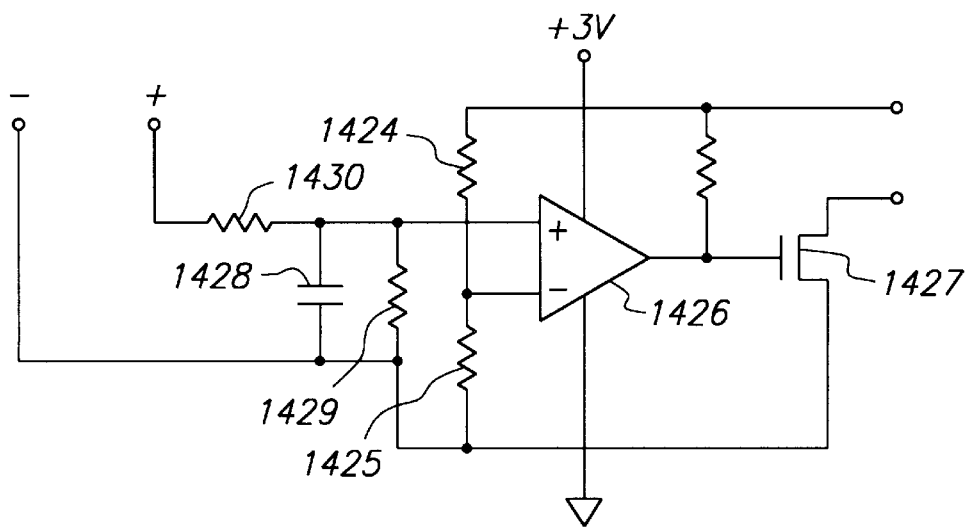

FIG. 5 shows a circuit diagram for a comparator suitable for use in FIG. 2. The comparator makes use of a 3-volt DC power supply (or a similar low voltage) which may be derived from the principal power source 12 or from a battery. Resistors 1424 and 1425 determine the reference voltage for an op-amp 1426; if desired one or both of resistors 1424 and 1425 can be a variable resistor, so that the reference voltage can be changed if desired. A capacitor 1428 and resistors 1429 and 1430 average the sensed current parameter over a desired time period to provide the desired voltage signal. When the signal voltage exceeds the reference voltage, the op-amp turns on a transistor FET 1427, causing current to flow through relay coil 143 (which must operate contact 144 upon application of the reference voltage).

What is claimed is:

1. An electrical protection system for connection in series between an electrical power supply and an electrical load to form an operating circuit, and which when so connected protects the circuit from overcurrents, the system having a normal operating condition and a fault condition, and comprising:
   (1) an integrating current sensing means having
      (a) a first state when a function of the size of the current passing through the load does not exceed a predetermined value, and
      (b) a second state when an overcurrent causes said function to exceed said predetermined value;
   (2) a first circuit switch which
      (a) has an open state and a closed state, and
      (b) is coupled to the current sensing means so that, when the first circuit switch is in a closed position and said function increases from below to above said predetermined value, the first circuit switch switches to the open state and remains latched in the open state;
   (3) a voltage sensing means having
      (a) a voltage deenergized state when the voltage across the voltage sensing means does not exceed a predetermined voltage amount, and
      (b) a voltage energized state when the voltage across the voltage sensing means exceeds the predetermined voltage amount;
   (4) a PTC device; and
   (5) a second circuit switch which
      (a) has an open state and a closed state, and
      (b) is coupled to the voltage sensing means so that, when the second circuit switch is in the closed state, and the voltage sensing means switches from the voltage deenergized state to the voltage energized state, the second circuit switch is converted from the closed state to the open state;
the components (1) to (5) being connected so that the first circuit switch, the PTC device and the voltage sensing means are connected in parallel with each other; the second circuit switch, and the parallel combination of the first circuit switch, the PTC device and the voltage sensing means, are connected in series; and, the second circuit switch is a switch which latches in the open state.

2. A system according to claim 1 wherein the integrating current sensing means comprises
   (i) a voltage output which provides a signal voltage related to said function;
   (ii) a voltage source which supplies a reference voltage; and
   (iii) a comparator which makes a comparison between the signal voltage and the reference voltage, and provides an output which reflects the result of that comparison.

3. A system according to claim 2 wherein the signal voltage is a voltage across a resistor connected in series with a load-carrying conductor through which flows a current proportional to the current through the load.

4. A system according to claim 2 wherein the integrating current sensing means includes a current transformer coupled to a load-carrying conductor through which flows a current proportional to the current through the load.

5. A system according to claim 2 wherein the integrating current sensing means comprises a magneto-resistive device coupled to a load-carrying conductor through which flows a current proportional to the current through the load.

6. A system according to claim 1 wherein said integrating current sensing means includes function-integrating means and wherein said function is an integral of (i) the size of the current passing through the load, and (ii) the duration of the current passing through the load, and said predetermined value cannot be exceeded when the duration of the overcurrent is less than 1 millisecond.

7. A system according to claim 6 wherein said function is an integral of the current passing through the integrating current sensing means over a period of at least 1 millisecond.

8. A system according to claim 6 wherein said function is an integral of the current passing through the integrating current sensing means over a period of at least 50 milliseconds.

9. A system according to claim 1 wherein said function is an integral of (i) the size of the current passing through the load, and (ii) the duration of the current passing through the load, and the integrating current sensing means can be programmed to change said predetermined value.

10. A system according to claim 1 wherein said function is an integral of (i) the size of the current passing through the load, and (ii) the duration of the current passing through the load, and the integrating current sensing means adaptively sets the predetermined value in response to observation of the current over a time period.

11. An electrical protection system for connection in series between an electrical power supply and an electrical load to form an operating circuit, and which when so connected protects the circuit from overcurrents, the system having a normal operating condition and a fault condition, and comprising:
   (1) a first relay, a second relay, a third relay and a fourth relay;
   (2) a current sensing means having
      (a) a current deenergized state, when a function of (i) the size of the current passing through the load, and (ii) the duration of the current passing through the load, does not exceed a predetermined value, and
      (b) a current energized state, when an overcurrent causes said function to exceed said predetermined value, and the current sensing means comprising
         (i) a voltage output which generates a signal voltage related to said function,
         (ii) a voltage source which supplies a reference voltage, and
         (iii) a comparator which makes a comparison between the signal voltage and the reference voltage, and provides an output which reflects the result of that comparison; an output from the comparator, when said function increases from below to above said predetermined value, closing the third relay which is normally open and which does not latch in a closed state, thus causing flow of a current which opens the first relay,
   (2) the first relay which
      (a) has a normally closed state and latches in an open state, and
      (b) is coupled to the current sensing means so that, when the first relay is in the normally closed state and said function increases from below to above said predetermined value, the output from the comparator converts the first relay from the normally closed state to the latched open state;
(3) a voltage sensing means including the fourth relay which has a normally open state and which has a latched closed state,
  (a) the normally open voltage deenergized state when the voltage across the voltage sensing means does not exceed a predetermined voltage amount, and
  (b) the latched closed, voltage energized state when the voltage across the voltage sensing means exceeds the predetermined voltage amount and thereby resulting in flow of a current opening the second relay;
(4) a PTC device; and
(5) the second relay which
  (a) has an open state and a closed state, and
  (b) is coupled to the voltage sensing means so that, when the second relay is in the closed state and the voltage sensing means is converted from the voltage deenergized state to the voltage energized state, the second relay is converted from the closed state to the open state and latches in the open state;
the first relay, the PTC device and the voltage sensing means being connected in parallel with each other; and the parallel combination of the first relay, the PTC device and the voltage sensing means, and the second relay being connected in series with each other.

12. An electrical circuit which comprises (i) an electrical power supply, (ii) an electrical load, and (iii) an electrical protection system connected in series between the electrical power supply and the electrical load to protect the circuit from overcurrents, the system having a normal operating condition and a fault condition, and comprising
(1) an integrating current sensing means having
  (a) a first state when a function of the size of the current passing through the load does not exceed a predetermined value, and
  (b) a second state when an overcurrent causes said function to exceed said predetermined value;
(2) a first circuit switch which
  (a) has an open state and a closed state, and
  (b) is coupled to the current sensing means so that, when the first circuit switch is in a closed position and said function increases from below to above said predetermined value, the first circuit switch switches to the open state and remains latched in the open state;
(3) a voltage sensing means having
  (a) a voltage deenergized state when the voltage across the voltage sensing means does not exceed a predetermined voltage amount, and
  (b) a voltage energized state when the voltage across the voltage sensing means exceeds the predetermined voltage amount;
(4) a PTC device; and
(5) a second circuit switch which
  (a) has an open state and a closed state, and
  (b) is coupled to the voltage sensing means so that, when the second circuit switch is in the closed state, and the voltage sensing means switches from the voltage deenergized state to the voltage energized state, the second circuit switch is converted from the closed state to the open state;
the components (1) to (5) being connected so that the first circuit switch, the PTC device and the voltage sensing means are connected in parallel with each other; the second circuit switch, and the parallel combination of the first circuit switch, the PTC device and the voltage sensing means, are connected in series; and, the second circuit switch is a switch which latches in the open state.

13. An electrical circuit which comprises (i) an electrical power supply, (ii) an electrical load, and (iii) an electrical protection system connected in series between the electrical power supply and the electrical load to protect the circuit from overcurrents, the system having a normal operating condition and a fault condition, and comprising
(1) a first relay, a second relay, a third relay and a fourth relay;
(2) a current sensing means having
  (a) a current deenergized state, when a function of (i) the size of the current passing through the load, and (ii) the duration of the current passing through the load, does not exceed a predetermined value, and
  (b) a current energized state, when an overcurrent causes said function to exceed said predetermined value, and the current sensing means comprising
    (i) a voltage output which generates a signal voltage related to said function,
    (ii) a voltage source which supplies a reference voltage, and
    (iii) a comparator which makes a comparison between the signal voltage and the reference voltage, and provides an output which reflects the result of that comparison; an output from the comparator, when said function increases from below to above said predetermined value, closing the third relay which is normally open and which does not latch in a closed state, thus causing flow of a current which opens the first relay,
(2) the first relay which
  (a) has a normally closed state and latches in an open state, and
  (b) is coupled to the current sensing means so that, when the first relay is in the normally closed state and said function increases from below to above said predetermined value, the output from the comparator converts the first relay from the normally closed state to the latched open state;
(3) a voltage sensing means including the fourth relay which has a normally open state and which has a latched closed state,
  (a) the normally open voltage deenergized state when the voltage across the voltage sensing means does not exceed a predetermined voltage amount, and
  (b) the latched closed, voltage energized state when the voltage across the voltage sensing means exceeds the predetermined voltage amount and thereby resulting in flow of a current opening the second relay;
(4) a PTC device; and
(5) the second relay which
  (a) has an open state and a closed state, and
  (b) is coupled to the voltage sensing means so that, when the second relay is in the closed state and the voltage sensing means is converted from the voltage deenergized state to the voltage energized state, the second relay is converted from the closed state to the open state and latches in the open state;
the first relay, the PTC device and the voltage sensing means being connected in parallel with each other; and the parallel combination of the first relay, the PTC device and the voltage sensing means, and the second relay being connected in series with each other.

* * * * *